UNITED STATES PATENT OFFICE.

HENRY G. MORRIS AND PEDRO G. SALOM, OF PHILADELPHIA, PENNSYLVANIA.

SECONDARY-BATTERY PLATE.

SPECIFICATION forming part of Letters Patent No. 466,138, dated December 29, 1891.

Application filed July 5, 1890. Serial No. 357,859. (No specimens.)

*To all whom it may concern:*

Be it known that we, HENRY G. MORRIS and PEDRO G. SALOM, both citizens of the United States, and residents of Philadelphia, Pennsylvania, have invented certain Improvements in Secondary-Battery Plates, of which the following is a specification.

The object of our invention is to dispense with the use of the high-priced oxides of lead—such as minium, litharge, and other lead salts and oxides—now used as the active material in secondary-battery plates, or partially replace such materials with a cheap substance fulfilling all the functions of the above-mentioned compounds, and which substance is found in large quantities in a native condition.

We have found that electrically the behavior of galena or sulphide of lead is analogous in its chemical reactions to the oxides. In the negative electrode as at present constituted hydrogen is liberated by the action of the current and takes oxygen from the litharge or other oxides to form water. When galena or the sulphide of lead is used as active matter, the liberated hydrogen combines with the sulphur of the sulphide to form sulphureted hydrogen, which escapes as gas. In the positive plate as at present constituted the oxygen which is liberated by the current in charging combines with the oxide or sulphate of lead and forms peroxide with the liberation of sulphuric acid. When galena is used, the liberated oxygen first oxidizes the sulphide and forms sulphate, which in turn is oxidized to peroxide with the liberation of sulphuric acid.

In making a negative-plate compound we prefer to mix the finely-pulverized galena with about ten per cent. of litharge, although a greater or less amount of the latter may be used, the litharge acting as a binder for holding the sulphide of lead in position in the plate until it is thoroughly reduced to spongy lead. In making a compound for the positive plate we add to the finely-pulverized galena or sulphide of lead about fifty per cent. of the pulverized peroxide and sulphate, preferably, for the sake of economy, using the material obtained from old worn-out elements, which acts both as a binder and as a conductor. Either the positive or negative plate filled with our improved compound may be formed separately or in conjunction with the other plate.

Having thus described our invention, we claim and desire to secure by Letters Patent—

1. A compound of sulphide of lead and a binder from which is formed the spongy-lead active material of a secondary-battery plate.

2. As an active material for a negative secondary-battery plate, a compound of sulphide of lead and oxide of lead, substantially as specified.

3. As an active material for a positive secondary-battery plate, a compound of sulphide of lead and lead peroxide, substantially as specified.

In testimony whereof we have signed our names to this specification in the presence of two subscribing witnesses.

HENRY G. MORRIS.
PEDRO G. SALOM.

Witnesses:
WILLIAM M. STEWART, Jr.,
HENRY HOWSON.